United States Patent [19]
Nguyen

[11] Patent Number: 6,038,338
[45] Date of Patent: Mar. 14, 2000

[54] HYBRID NEURAL NETWORK FOR PATTERN RECOGNITION

[75] Inventor: Chung T. Nguyen, Bristol, R.I.

[73] Assignee: The United States of America as represented by the Secretary of the Navy, Washington, D.C.

[21] Appl. No.: 08/802,572

[22] Filed: Feb. 3, 1997

[51] Int. Cl.[7] .................................................. G06K 9/62
[52] U.S. Cl. ........................................ 382/159; 382/158
[58] Field of Search .................................... 382/155, 187, 382/158, 157, 159; 395/23; 365/49; 706/16, 25, 29, 33, 46

[56] References Cited

U.S. PATENT DOCUMENTS

| | | | |
|---|---|---|---|
| 5,023,833 | 6/1991 | Baum et al. | 365/49 |
| 5,105,468 | 4/1992 | Guyon et al. | 382/158 |
| 5,293,456 | 3/1994 | Guez et al. | 382/158 |
| 5,390,284 | 2/1995 | Ogata et al. | 706/25 |
| 5,402,519 | 3/1995 | Inoue et al. | 706/16 |
| 5,426,745 | 6/1995 | Baji et al. | 382/159 |
| 5,581,660 | 12/1996 | Horan | 706/40 |
| 5,712,922 | 1/1998 | Loewenthal et al. | 382/155 |

*Primary Examiner*—Amelia Au
*Assistant Examiner*—Samir Ahmed
*Attorney, Agent, or Firm*—Michael J. McGowan; Michael F. Oglo; Prithvi C. Lall

[57] ABSTRACT

A system and a method for recognizing patterns comprises a first stage for extracting features from inputted patterns and for providing topological representations of the characteristics of the inputted patterns and a second stage for classifying and recognizing the inputted patterns. The first stage comprises two one-layer neural networks and the second stage comprises a feedforward two-layer neural network. Supplying signals representative of a set of inputted patterns to the input layers of the first and second neural networks, training the first and second neural networks using a competitive learning algorithm, and generating topological representations of the input patterns using the first and second neural networks The method further comprises providing a third neural network for classifying and recognizing the inputted patterns and training the third neural network with a back-propagation algorithm so that the third neural network recognizes at least one interested pattern.

13 Claims, 2 Drawing Sheets

HYBRID NEURAL NETWORK FOR PATTERN RECOGNITION

CROSS REFERENCE TO RELATED PATENT APPLICATION

The present invention is related to co-pending U.S. Patent Application entitled WAVELET-BASED HYBRID NEUROSYSTEM FOR SIGNAL CLASSIFICATION, By Chung T. Nguyen et al. (Navy Case No. 78080) having the same filing date.

STATEMENT OF GOVERNMENT INTEREST

The invention described herein may be manufactured and used by or for the Government of the United States of America governmental purposes without the payment any royalties thereon or therefor.

BACKGROUND OF THE INVENTION (1) Field of the Invention

The present invention relates to a system and a method for recognizing patterns which has particularly utility in the field of combat system technology and to the area of signal processing, feature extraction and classification.

(2) Description of Prior Art

In a conventional pattern recognition system, the task to be performed is divided into three phases: data acquisition; data preprocessing; and decision classification. FIG. 1 is a schematic representation of a conventional pattern recognition system. In the data acquisition phase 10, analog data from the physical world are gathered through a transducer and converted to digital format suitable for computer processing. More particularly, the physical variables are converted into a set of measured data, indicated in FIG. 1 by electric signals, x(r), if the physical variables are sound (or light intensity) and the transducer is a microphone (or photocells). The measured data is then used as the input to the second phase 12 (data preprocessing) and is grouped in a third phase 14 into a set of characteristic features, P(i), as output. The third phase 14 is actually a classifier or pattern recognizer which is in the form of a set of decision functions.

Signal classification or pattern recognition methods are often classified as either parametric or nonparametric. For some classification tasks, pattern categories are known a priori to be characterized by a set of parameters. A parametric approach is to define the discriminant function by a class of probability densities by a relatively small number of parameters. There exist many other classifications in which no assumptions can be made about the characterizing parameters. Nonparametric approaches are designed for those tasks. Although some parameterized discriminant functions, e.g. the coefficients of a multivariate polynomial of some degree, are used in nonparametric methods, no conventional form of the distribution is assumed.

In recent years, one of the nonparametric approaches for pattern classification is neural network training. In neural network training for pattern classification, there are a fixed number of categories (classes) into which stimuli (activation) are to be classified. To resolve it, the neural network first undergoes a training session, during which the network is repeatedly presented a set of input patterns along with the category to which each particular pattern belongs. Then later on, there is presented to the network a new pattern which has not been presented to it before but which belongs to the same population of patterns used to train the network. The task for the neural network is to classify this new pattern correctly. Pattern classification as described here is a supervised learning problem. The advantage of using a neural network to perform pattern classification is that it can construct nonlinear decision boundaries between the different classes in nonparametric fashion, and thereby offer a practical method for solving highly complex pattern classification problems.

Signal classification involves the extraction and partition of feature of targets of interest. In many situations, the problem is complicated by the uncertainty of the signal origin, fluctuations in the presence of noise, the degree of correlation of multi-sensor data, and the interference of the nonlinearities in the environment. Research and studies in the past have focused on developing robust and efficient methods and devices for recognizing patterns in signals, many of which have been developed from traditional signal processing techniques, and known artificial neural network technology. There still remains however a need for a system and a method for providing high classification performance.

SUMMARY OF THE INVENTION

Accordingly, it is an object of the present invention to provide a system and a method which enables high classification performance.

It is a further object of the present invention to provide a system and a method as above which has and utilizes a self-organizing feature architecture.

The foregoing objects are attained by the system and the method of the present invention.

In accordance with the present invention, a system for recognizing patterns comprises first means for extracting features from inputted patterns and for providing topological representations of the characteristics of the inputted patterns and second means for classifying and recognizing the inputted patterns. In a preferred embodiment of the present invention, the first means comprises two one-layer neural networks and the second means comprises a feedforward two-layer neural network.

Further in accordance with the present invention, a method for recognizing patterns broadly comprises the steps of providing first and second neural networks each having an input layer formed by a plurality of input neurons and an output layer formed by a plurality of output neurons, supplying signals representative of a set of input patterns to the input layers of the first and second neural networks, training the first and second neural networks using a competitive learning algorithm, and generating topological representations of the input patterns using the first and second neural network means. The method further comprises providing a third neural network means for classifying and recognizing the input patterns and training the third neural network means with a back-propagation algorithm so that said third neural network means recognizes at least one interested pattern.

Other details of the system and the method of the present invention, as well as other objects and advantages attendant thereto, are set forth in the following detailed description wherein like reference numerals depict like elements.

DESCRIPTION OF THE PREFERRED EMBODIMENT

As previously discussed, the present invention relates to a system and to a method for pattern recognition which utilize advanced neural network training algorithms to train a hybrid neural network. The term "hybrid" in the foregoing context refers to the fact that the architecture includes components utilizing different types of network training algorithms with the different algorithms contributing to the performance of a single function. Information presented to the system is in the form of characteristic features of the underlying signal. Based on the distinction in the signal's characteristics, the system classifies and associates each input data to its corresponding category.

Figure 1:
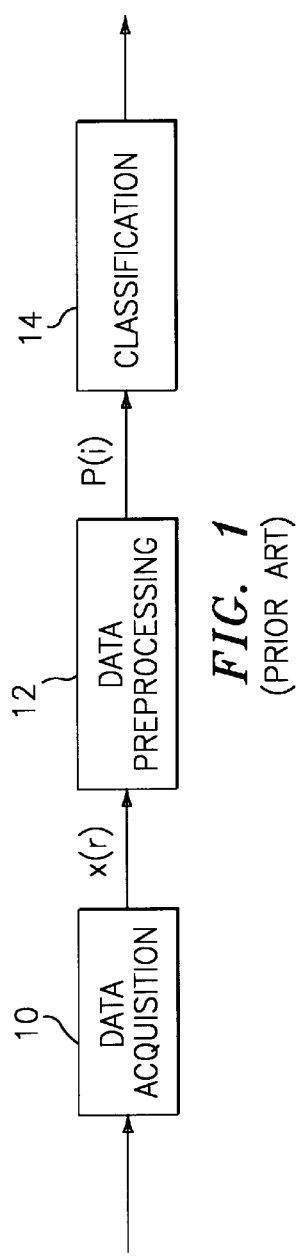
FIG. 1 is a schematic representation of a prior art pattern recognition system.
Figure 2:
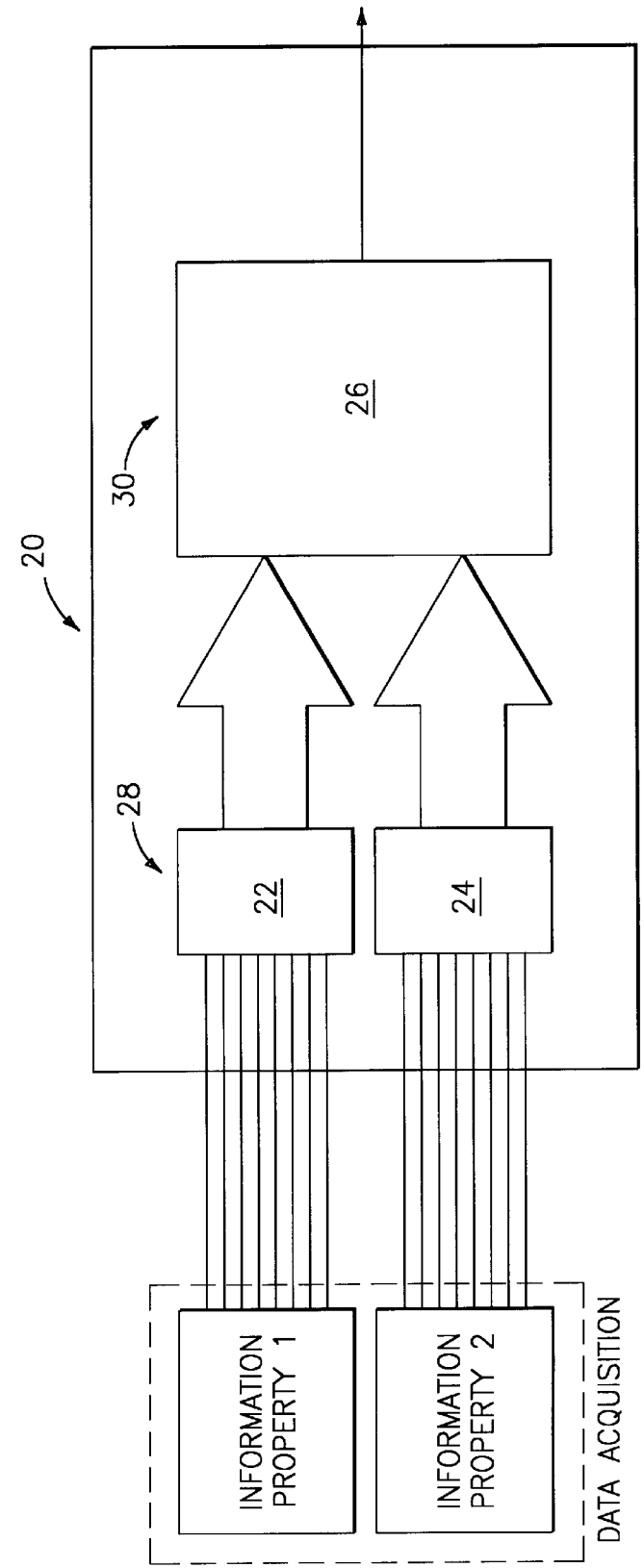
FIG. 2 is a schematic representation of a layout of a hybrid neural network for pattern recognition.

Referring now to the drawings, FIG. 2 illustrates the layout of the hybrid neural network system 20 for pattern recognition of the present invention. As shown therein, the hybrid neural network system 20 consists of three separate artificial neural networks 22, 24, and 26 and is divided into two stages 28 and 30.

The first stage 28 is known as the feature extraction stage and consists of two neural networks 22 and 24. The networks 22 and 24 are each one-layer networks with lateral connections among output neurons. The networks 22 and 24 are each trained with an unsupervised learning algorithm. The second stage 30 of the system is the signal classification network. This stage is formed by a fully connected, feedforward two-layer network 26 which is trained with a back-propagation algorithm.

Figure 3:
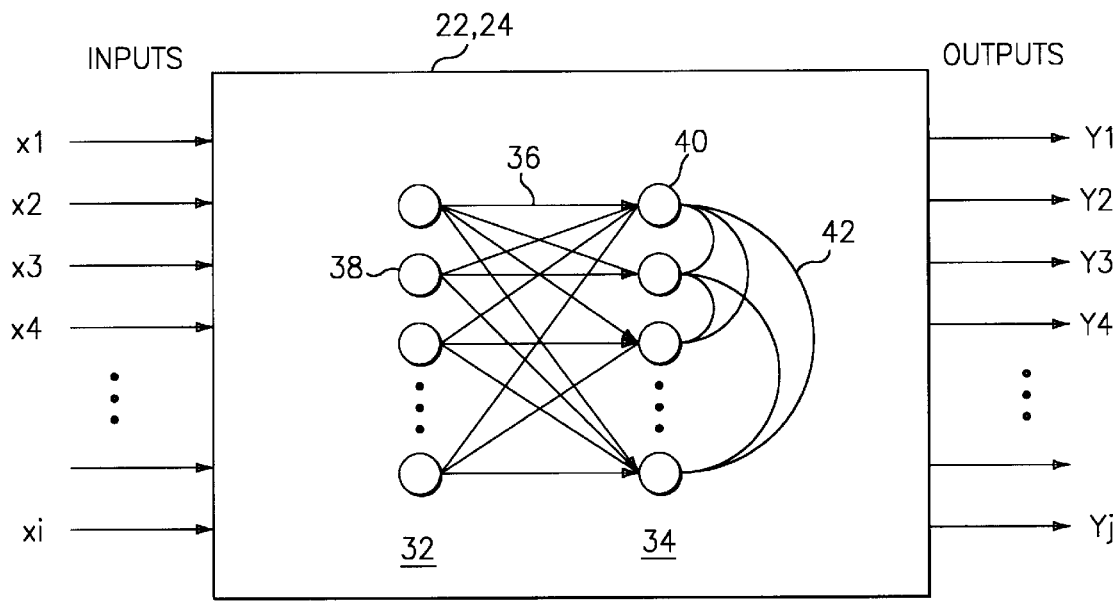
FIG. 3 is a schematic representation of the architecture of the feature extraction neural network used in the neural network of FIG. 2.

Referring now to FIG. 3, each of the neural networks 22 and 24 used for feature extraction consists of an input layer 32 formed by a plurality of input layer neurons 38 and an output layer 34 formed by a plurality of output layer neurons 40 with synaptic feedforward (excitatory) connections 36 from the input layer neurons 38 to the output layer neurons 40 and lateral (inhibitory) connections 42 among neurons 40 in the output layer 34. The output neurons generate outputs Y1 through Yj, where j equals the number of output neurons. In each network, the neuron cells at the output layer compete in their activities by means of mutual lateral interactions and develop adaptively into specific detectors of different signal patterns through an unsupervised learning process. In one embodiment of the present invention, each network 22 and 24 may consist of 100 neurons (50 input neurons and 50 output neurons) with each output neuron 40 being fully connected to the 50 input neurons 38.

The input neurons 38 in the input layer 32 of each network receive input signals x1–xi, where i equals the number of input neurons 38, in digital form, which input signals contain information about certain properties or characteristics of the underlying signals from a data acquisition source. While the two neural networks 22 and 24 forming the feature extraction stage 28 are identical in architecture, they receive different input information.

Each of the networks 22 and 24 is designed so that at a given time only one neuron cell or a local group of neuron cells gives an active response to the current input. As a result, the locations of the responses tend to become ordered as if meaningful coordinate systems for different input features were being created over the network. The spatial location of a cell in the network corresponding to a particular domain of signal patterns provides an interpretation of the input information.

A set of competitive learning rules based on the Kohonen algorithm may be used to train each of the neural networks 22 and 24 forming the feature extraction stage 28. As unsupervised training progresses using these competitive learning rules, a feature map evolves which provides a topological representation of the input patterns.

Each feature extraction network 22 and 24 generates a topological map as follows. At the input layer 32 of the feature extraction neural network 22 or 24, properties or characteristics of the input information, i.e. times, amplitude, phase, wavelet transform location output information, wavelet transform magnitude information, etc., are inputted. Illustrative of an embodiment of system 20 which is of special utility in connection with an application of underwater acoustics to classify sounds emitted by torpedoes is the system described in the above identified co-pending application filed on an even date herewith of C. T. Nguyen, S. E. Hammel and K. F. Gong entitled "Wavelet-Based Hybrid Neurosystem for Signal Classification" (Navy Case No. 78080), hereby incorporated by reference herein. When processing this information, each input neuron 38 computes the data it receives and presents the result to each of the neurons 40 of the output layer 34. There, the lateral connections 42 perform lateral inhibition, with each neuron 40 tending to inhibit the neuron 40 to which it is laterally connected. The final processing results, sometimes referred to as a topological map, are forwarded to stage 30 for operation with or for the training of the classification network 26.

As previously discussed, a competitive learning algorithm is used to train the feature extraction networks 22 and 24. In competitive learning, the output neurons of a neural network compete among themselves to be the one to be active. Thus, only a single output neuron is active at any one time. It is this feature that makes competitive learning highly suited to discover those statistically salient features that may be used to classify a set of input patterns. There are three basic elements to a competitive learning rule. They are: (1) a set of neurons that are all the same except for some randomly distributed synaptic weights, and which therefore respond differently to a given set of input patterns; (2) a limit imposed on the "strength" of each neuron; and (3) a mechanism that permits the neurons to compete for the right to respond to a given set of inputs, such that only one output neuron is active at a time. Accordingly, the individual neurons of the network learn to specialize on sets of similar patterns, and thereby become a feature detector or feature extractor.

The competitive learning algorithm used in the method of the present invention to train each network 22 and 24 is as follows. For output neuron j to be the winning neuron, its net internal activity level, $v_j$, for a specified input pattern x must be the largest among all the neurons in the network. The output signal, $y_j$, of the winning neuron j is set equal 1; the output signals of all the neurons that lose the competition are set equal to zero.

Let $w_{ji}$ denote the synaptic weight connecting input node i to neuron j. Each neuron is allotted a fixed amount of synaptic weight (all synaptic weights are positive), which is distributed among its input nodes; that is $$\sum_i w_{ji} = 1, \forall j \qquad (1)$$

A neuron learns by shifting synaptic weights from its inactive to active input nodes. If a neuron does not respond to a particular input pattern, no learning takes place in that neuron. If a particular neuron wins the competition, then each input node of that neuron relinquishes some proportion of the synaptic weight, and the weight relinquished is then distributed equally among the active input nodes. In a standard competitive learning rule, the change $\Delta w_{ji}$ applied to synaptic weight $w_{ji}$ is defined by:

$$\Delta w_{ji} = \begin{array}{ll} \eta(x_i - w_{ji}) & \text{if neuron } j \text{ wins} \\ 0 & \text{if neuron } j \text{ loses} \end{array} \quad (2)$$

where $\eta$ is the learning rate parameter. This rule has the overall effect of moving the synaptic weight vector $w_j$ of winning neuron j toward the input pattern x. To this end, each of the output neurons has discovered a set of feature of inputs.

The classification artificial neural network 26 is preferably a standard two-layer, fully connected feedforward network. The architecture of this network may be termed a multilayer perceptron configuration. The classification neural network 26 is trained in a supervised manner to recognize one particular type of the interested patterns using an algorithm known as the error back propagation algorithm or back propagation algorithm. This algorithm is based on the error correction learning rule:

$$\Delta w_{ji}(n) = -\eta \frac{\partial \varepsilon(n)}{\partial w_{ji}(n)} \quad (3)$$

where $\eta$ is a constant that determines the rate of learning, $\Delta w_{ji}$ is the correction weight, and $\epsilon$ is the error. The use of the minus sign in Equation (3) accounts for the gradient descent in weight space.

Figure 4:
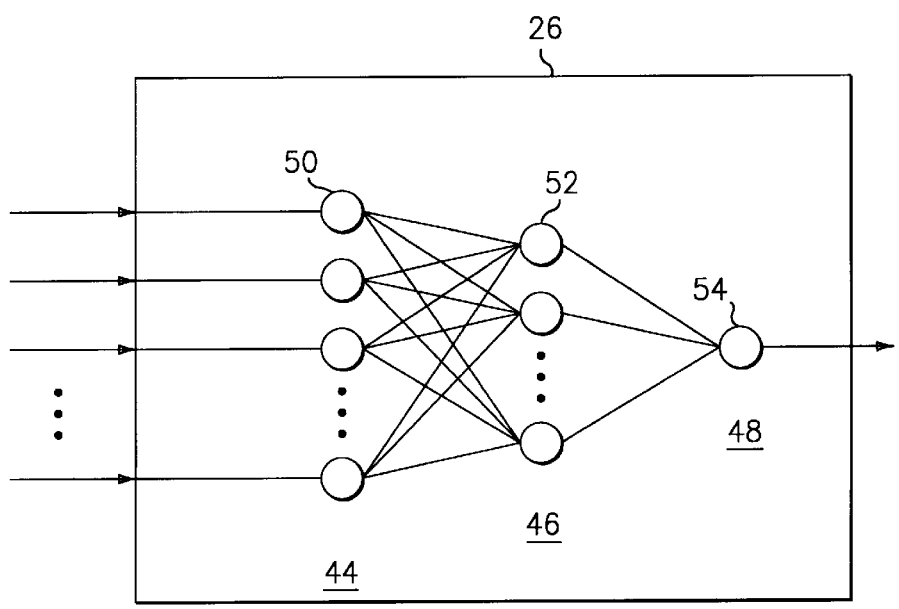
FIG. 4 is a schematic representation of the classification neural network used in the neural of FIG. 2.

The architecture of the classification neural network 26 is shown in FIG. 4. As shown therein, there are three layers in its configuration: an input layer 44 formed by a plurality of input neurons 50, a hidden layer 46 formed by a plurality of neurons 52, and an output layer 48 formed by one output neuron 54. The input layer 44 is preferably constructed with 100 input neurons with each input neuron receiving information from a respective output neuron 40 in the feature extraction networks 22 and 24. The hidden layer 46 consists of 20 neurons. At the end of the training, the classification neural network 26 performs a binary classification on each given input pattern. The outputs of the classification network 26 are designated as "1" and "0" for matched signal or no-match signal, respectively.

As can be seen from the foregoing description, a novel hybrid neural network for pattern recognition has been presented. The concept of a hybrid neural network architecture in accordance with the present invention which incorporates different training algorithms makes the system unique and provides high classification performance. More particularly, the hybrid neural network providing the intermediate result of a self-organizing feature map in accordance with the present invention offers the following advantages.

The self-organizing system architecture discussed hereinbefore has been designed as a viable alternative to more traditional neural network architectures. The feature extraction components in the system function as self-organizing systems to provide topological feature maps uniquely representing the underlying signal's characteristics. Thus, complex input information is converted to simpler forms, i.e. topological feature maps, has an important impact upon the overall training requirements connected with making the hybrid neural network operational. Specifically, as a result of the presence of the feature maps, the network's learning process is accelerated and the training time is reduced significantly.

Since the topological maps obtained from the two feature extraction networks 22 and 24 are a unique representation of each input pattern, the network provides a highly accurate pattern classification.

While the invention has been described in combination with specific embodiments thereof, it is evident that many alternatives, modifications and variations will be apparent to those skilled in the art in light of the foregoing description. Accordingly, it is intended to embrace all such alternatives, modifications, and variations as fall within the spirit and broad scope of the appended claims.

What is claimed is:

1. A system for recognizing patterns which comprises:
   a first stage for extracting features from inputting patterns and for providing topological representations of the characteristics of said inputted patterns;
   said first stage comprising a first neural network for receiving a first set of input information and for generating a first set of topographical representations from said first set of input information and a second neural network for receiving a second set of input information, which second set of input information is different from said first set of input information, and for generating a second set of topographical representations from said second set of input information;
   a second stage for classifying and recognizing said inputted patterns; and
   said second stage comprising a feedforward two-layer neural network which uses said topological representations of said input patterns generated by said first and second neural networks for training said system.

2. A system according to claim 1 wherein each of said first and second neural networks comprises a one-layer network having an input layer formed by a plurality of input neurons and an output layer formed by a plurality of output neurons.

3. A system according to claim 2 wherein the sets of input information contain information about a plurality of properties in said input signal and each of said sets of input information contain information about different ones of said properties.

4. A system according to claim 3 wherein each input neuron in said input layer computes information which it receives and presents the results to each neuron in said output layer.

5. A system for recognizing patterns which comprises:
   first means for extracting features from inputted patterns and for providing topological representations of the characteristics of said inputted patterns;
   said first means comprising a first neural network for receiving a first set of input information and for generating a first set of topographical representations from said first set of input information and a second neural network for receiving a second set of input information different from said first set of input information and for generating a second set of topographical representations from said second set of input information;
   second means for classifying and recognizing inputted patterns;
   said second means comprising a feedforward two-layer neural network which uses said topological representations of said input patterns generated by said first and second neural networks for training said system;

each of said first and second neural networks comprises a one-layer network having an input layer formed by a plurality of input neurons and an output layer formed by a plurality of output neurons; and said input neurons are connected to said output neurons by feedforward connections and wherein said output neurons are laterally connected so that each output neuron tends to inhibit each neuron to which it is laterally connected.

6. A system according to claim 1 wherein said two-layer neural network comprises an input layer formed by a plurality of input neurons, a hidden layer formed by a plurality of neurons which are fewer in number than the number of neurons forming said input layer, and an output layer formed by a single output neuron.

7. A system according to claim 6 wherein said output neuron generates a first output signal representative of a match or a second output signal representative of a non-match.

8. A method for recognizing patterns which comprises:

providing first and second neural networks each having an input layer formed by a plurality of input neurons and an output layer formed by a plurality of output neurons;

supplying signals representative of features of a set of inputted patterns to the input layers of said first and second neural networks with a first set of inputted patterns being supplied to the input layer of the first neural network and a second set of inputted patterns different from the first set being supplied to the input layer of the second neural network;

training said first and second neural networks using a competitive learning algorithm;

generating topological representations of the inputted patterns using said first and second neural networks;

providing a third neural network for classifying and recognizing said inputted patterns; and inputting said topological representations into said third neural network.

9. A method according to claim 8 further comprising:

training said third neural network with a back-propagation algorithm and said inputted topological representations so that said third neural network recognizes at least one interested pattern.

10. A method according to claim 9 wherein said third neural network training step comprises using an algorithm based on the error correction learning rule:

$$\Delta w_{ji}(n) = -\eta \frac{\partial \varepsilon(n)}{\partial w_{ji}(n)}$$

where $\eta$ is a constant that determines the rate of learning, $\Delta w_{ji}$ is the correction weight, and $\epsilon$ is the error.

11. A method according to claim 8 wherein said training step comprises training said output neurons to compete among themselves to be the one active output neuron at a particular instant of time.

12. A hybrid neural network system for pattern recognition which comprises:

a first feature extraction stage for extracting features from inputting patterns and for providing topological representations of the characteristics of said inputted patterns;

said first feature attraction stage comprising a first neural network for receiving a first set of input information and for generating a first set of topographical representations from said first set of input information and a second neural network for receiving a second set of input information different from said first set of input information and for generating a second set of topographical representations from said second set of input information;

a second classification stage for classifying and recognizing said inputted patterns; and said second classification stage comprising a feedforward two-layer neural network which uses said topological representations of said input patterns generated by said first and second neural networks for training said system.

13. The hybrid neural network of claim 12, further comprising:

said first and second neural networks each being of the type to be trained using an unsupervised competitive learning algorithm; and said feedforward two-layer neural network being of the type to be trained using a back-propagation algorithm.

* * * * *